US009438854B2

(12) United States Patent
Cho

(10) Patent No.: US 9,438,854 B2
(45) Date of Patent: Sep. 6, 2016

(54) IMAGING APPARATUS AND CONTROL METHOD THEREOF

(71) Applicant: SAMSUNG ELECTRONICS CO., LTD., Suwon-si (KR)

(72) Inventor: Dae Woo Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 13/729,711

(22) Filed: Dec. 28, 2012

(65) Prior Publication Data

US 2013/0169739 A1    Jul. 4, 2013

(30) Foreign Application Priority Data

Dec. 29, 2011    (KR) .......................... 10-2011-0145391

(51) Int. Cl.

| H04N 7/14 | (2006.01) |
|---|---|
| H04N 21/422 | (2011.01) |
| H04N 21/4223 | (2011.01) |
| H04N 21/439 | (2011.01) |
| H04N 21/4788 | (2011.01) |

(52) U.S. Cl.
CPC .......... *H04N 7/148* (2013.01); *H04N 21/4223* (2013.01); *H04N 21/42203* (2013.01); *H04N 21/439* (2013.01); *H04N 21/4788* (2013.01)

(58) Field of Classification Search
CPC ........ H04N 7/15; H04N 7/147; H04N 7/152; H04N 7/141
USPC ..................... 348/14.01, 14.04, 14.08, 14.13; 379/102.03, 406.01, 406.03
See application file for complete search history.

(56) References Cited

U.S. PATENT DOCUMENTS

| 6,590,602 B1* | 7/2003 | Fernandez .......... H04L 12/1813 348/14.08 |
|---|---|---|
| 7,102,663 B2 | 9/2006 | Crook |
| 7,184,077 B2 | 2/2007 | Kitajima |
| 7,221,387 B2 | 5/2007 | Fernandez et al. |
| 8,111,280 B2 | 2/2012 | Kim |
| 9,030,968 B2 | 5/2015 | Furlong et al. |
| 2002/0012471 A1 | 1/2002 | Nayyar |
| 2004/0055011 A1 | 3/2004 | Bae et al. |
| 2007/0050778 A1* | 3/2007 | Lee .................... H04N 5/44591 718/107 |
| 2007/0216760 A1* | 9/2007 | Kondo ...................... H04N 5/76 348/14.02 |
| 2009/0079813 A1 | 3/2009 | Hildreth |
| 2010/0066804 A1* | 3/2010 | Shoemake ............. H04N 7/147 348/14.02 |

(Continued)

FOREIGN PATENT DOCUMENTS

| EP | 0944228 A1 | 9/1999 |
|---|---|---|
| JP | 2010-81220 A | 4/2010 |
| WO | 2005/096626 A2 | 10/2005 |

OTHER PUBLICATIONS

Communication dated Feb. 5, 2014, issued by the European Patent Office in counterpart European Application No. 12199352.1.

*Primary Examiner* — Quoc D Tran
(74) *Attorney, Agent, or Firm* — Sughrue Mion, PLLC

(57) ABSTRACT

Disclosed herein are an imaging apparatus and a control method thereof. The apparatus enables a user to simultaneously conduct a video call while watching a broadcasting program. When transmitting an acoustic signal to an opposite user, the apparatus cancels the speech of the opposite user and the background sound from the broadcasting program, and thus, superior communication quality may be maintained.

17 Claims, 10 Drawing Sheets

(56) References Cited

U.S. PATENT DOCUMENTS

| | | |
|---|---|---|
| 2010/0073455 A1* | 3/2010 | Iwabuchi et al. .......... 348/14.04 |
| 2010/0194845 A1 | 8/2010 | Cho et al. |
| 2010/0272251 A1 | 10/2010 | Banba et al. |
| 2012/0293604 A1* | 11/2012 | Read .......................... 348/14.08 |
| 2013/0088561 A1 | 4/2013 | Cho et al. |

* cited by examiner

IMAGING APPARATUS AND CONTROL METHOD THEREOF

CROSS-REFERENCE TO RELATED APPLICATION

This application claims priority from Korean Patent Application No. 10-2011-0145391, filed on Dec. 29, 2011, in the Korean Intellectual Property Office, the disclosure of which is incorporated herein by reference in its entirety.

BACKGROUND

1. Field

Exemplary embodiments relate to an image forming apparatus which is capable of simultaneously conducting a video call and providing a broadcasting program, and a control method thereof.

2. Description of the Related Art

In general, an imaging apparatus is an apparatus which is configured to output an image signal in various forms after processing the image signal, and as a typical imaging apparatus, a television (TV) may be included. In recent years, as a digital TV having a superior ability with respect to processing a signal and with respect to storing a signal as compared with a conventional analog TV is being developed and commercialized, particularly in conjunction with an Internet connection which exists in many households, a content service of various types, such as a real-time broadcasting, a Content on Demand (COD), a game, and a video call, is being provided to a user.

In particular, a service which provides video telephony through a digital TV is anticipated to be used by a user in a highly productive manner, but a difficulty of not being able to simultaneously proceed with a video call while watching a broadcasting program through the digital TV may be present.

In detail, in a case of conducting a video call while watching a broadcasting program, the sound from the TV is transmitted to an opposite user together with the speech of a user, and in order to prevent such, in a case when conducting a video call, the sound from the TV is forcedly reduced, or a mute function is carried out. In addition, the speech of the opposite user, which is being output through the TV, may be retransmitted to the opposite user together with the speech of the user, and as a result, a reduction in video telephony quality may occur.

SUMMARY

In an aspect, exemplary embodiments provide an imaging apparatus which is capable of simultaneously conducting a video call and providing a broadcasting program, and a control method thereof.

In an aspect, with respect to transmitting the speech signal of a user to an opposite user, exemplary embodiments provide an image apparatus and a control method thereof which are capable of maintaining superior video call quality by cancelling the voice of the opposite user and the background sound of the broadcasting program.

Additional aspects will be set forth in part, in the description which follows and, in part, will be obvious from the description, or may be learned by practice of the exemplary embodiments.

In accordance with one aspect, an exemplary embodiment provides an imaging apparatus for conducting a video call. The main apparatus includes a broadcasting signal receiver, a transceiver, an acoustic output unit, a user input unit, a first background sound canceller, and a second background sound canceller. The broadcasting signal receiver may receive a broadcasting signal which includes a first image signal and a first acoustic signal. The transceiver may transceive a second image signal and a first, speech signal via a network. The acoustic output unit may output the received first acoustic signal and the received first speech signal. The user input unit, may receive a second acoustic signal which includes a second speech signal which is generated by a user. The first background sound canceller may generate a first output signal by cancelling the received first acoustic signal from the received second acoustic signal. The second background sound canceller may receive the generated first output signal from the first background sound canceller and generate a second output signal by cancelling the received first speech signal from the received first output signal.

The first background sound canceller may include a first Acoustic Echo Canceller (AEC), and the first Acoustic Echo Canceller may use the first acoustic signal as a reference signal.

The second background sound canceller may include a second Acoustic Echo Canceller (AEC), and the second Acoustic Echo Canceller may use the first speech signal as a reference signal.

The imaging apparatus may further include a first acoustic processor which decodes the received first acoustic signal. The first background sound canceller may use the decoded first acoustic signal as a reference signal.

The imaging apparatus may further include a second acoustic processor which decodes the transceived first speech signal. The second background sound canceller may use the decoded first speech signal as a reference signal.

The imaging apparatus may further include a speech encoder which encodes the second output signal.

In accordance with another aspect of one or more exemplary embodiments, an imaging apparatus for conducting a video call includes a broadcasting signal receiver, a transceiver, an acoustic output unit, a user input unit and a background sound canceller. The broadcasting signal receiver may receive a broadcasting signal which includes a first image signal and a first acoustic signal. The transceiver may transceive a second image signal and a first speech signal via a network. The acoustic output unit may output the received first acoustic signal and the transceived first speech signal in an acoustic form. The user input unit may receive a second acoustic signal, which includes a second speech signal which is generated by a user, and an image signal relating to the user. The background sound canceller may cancel the received first acoustic signal and the transceived first speech signal from the received second acoustic signal.

The background sound canceller may include an Acoustic Echo Canceller (AEC), and the Acoustic Echo Canceller may include a multi-channel Acoustic Echo Canceller which uses at least two reference, signals.

The at least two reference signals used by the background sound canceller may include the received first acoustic signal and the transceived first speech signal.

The imaging apparatus may further include a first acoustic processor which decodes the received first acoustic signal and a second acoustic processor which decodes the transceived first speech signal. The background sound canceller may use the decoded first acoustic signal and the decoded first speech signal as reference signals.

In accordance with another aspect, one or more exemplary embodiments provide a method for controlling an imaging apparatus which conducts a video call between a first user and a second user. In the method, a broadcasting signal which includes a first image signal and a first acoustic signal is received. A second image signal and a first speech signal are received from the second user. The received first acoustic signal received and the received first speech signal, are output. A second acoustic signal which includes speech generated by the first user is received. A first output signal is generated by cancelling the received first acoustic signal from the received second acoustic signal. A second output signal is generated by cancelling the received first speech signal from the generated first output signal.

The generating of the first output signal may be performed by using a first Acoustic Echo Canceller (AEC), and the first Acoustic Echo Canceller may use the received first acoustic signal received as a reference signal.

The generating of the second output signal may be performed by using a second Acoustic Echo Canceller (AEC), and the second Acoustic Echo Canceller may use the received first speech signal as a reference signal.

The method may further include encoding the second output signal, and transmitting the encoded second output signal to the second user via a network.

In accordance with another aspect, one or more exemplary embodiments provide a method for controlling an imaging apparatus which conducts a video call between a first, user and a second user. In the method, a broadcasting signal which includes a first image signal and a first acoustic signal is received via a broadcasting signal receiver. A second image signal and a first speech signal may be received from the second user via a transceiver. The received first acoustic signal and the received first, speech signal are output in an acoustic form via an acoustic sound output unit. A second acoustic signal which includes speech generated by the first user is received via a user input unit. The received first acoustic signal and the received first speech signal are cancelled from the received second acoustic signal.

The cancelling of the received first acoustic signal and the received first speech signal from the received second acoustic signal may be performed by using an Acoustic Echo Canceller (AEC), and the Acoustic Echo Canceller may include a multi-channel Acoustic Echo Canceller which uses at least two reference signals.

The at least two reference signals used by the Acoustic Echo Canceller may include the received first acoustic signal and the received first speech signal.

As described above, by using the imaging apparatus and the control method thereof according to one or more exemplary embodiments, a video call may be simultaneously be conducted with an opposite user while watching a broadcasting program, and at this time, with respect to transmitting an acoustic signal to the opposite user, the voice of the opposite user being output from the TV as well as the background sound from the broadcasting program are cancelled, and thereby superior video call quality may be maintained.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
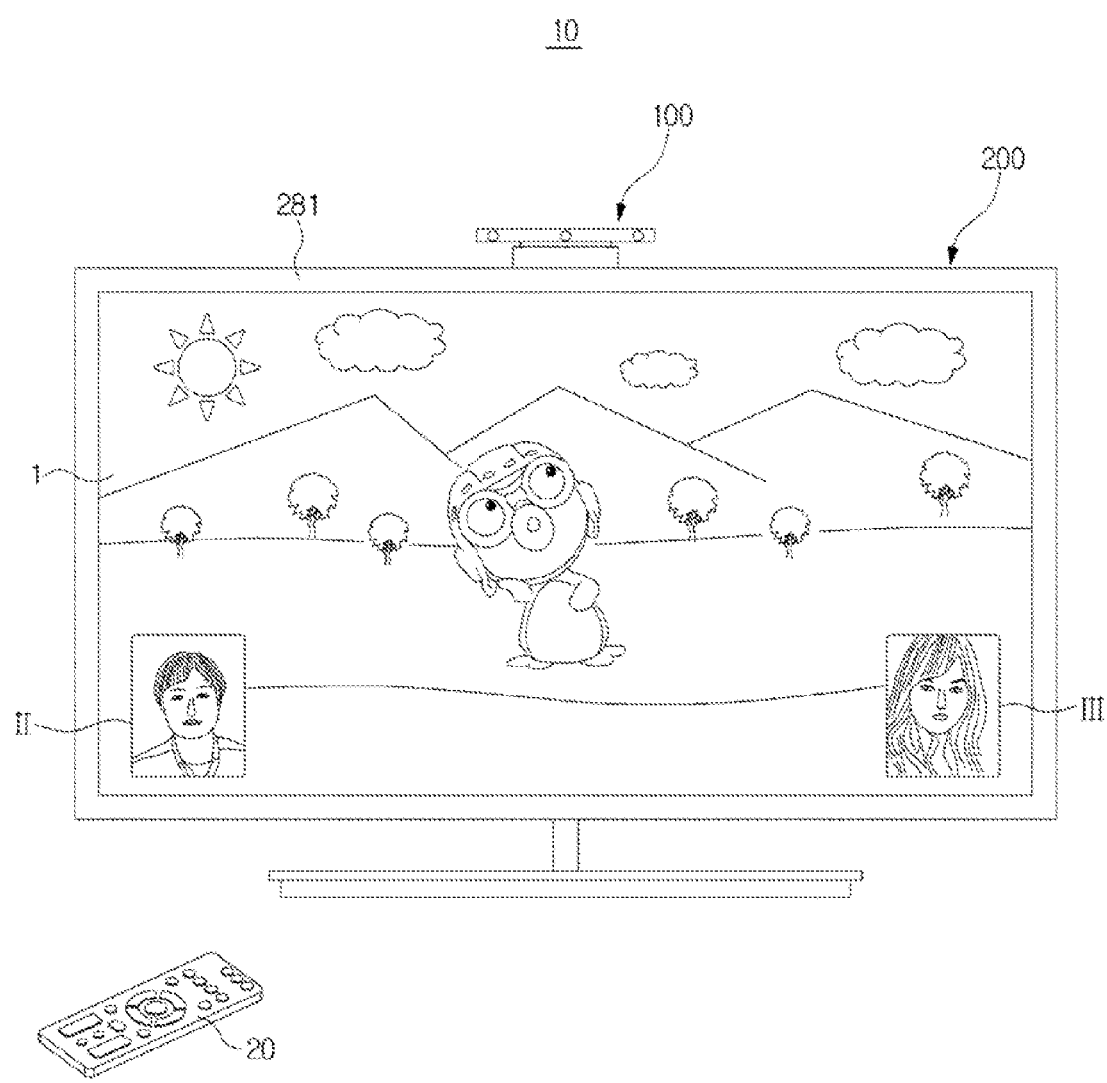
FIG. 1 is a drawing which illustrates an overall exterior appearance of an imaging apparatus, in accordance with an exemplary embodiment.

Reference will now be made in detail to exemplary embodiments, examples of which are illustrated in the accompanying drawings, wherein like reference numerals refer to like elements throughout.

FIG. 1 illustrates an overall exterior appearance of an imaging apparatus, in accordance with an exemplary embodiment.

Referring to FIG. 1, an imaging apparatus 10 in accordance with an exemplary embodiment may be implemented as a digital TV, and the digital TV includes a display 281 which outputs an image signal of a broadcasting program or an image signal which is provided by an opposite user of a video call in the form of an image, an acoustic output unit 282 which outputs an acoustic signal of the broadcasting program or a speech signal which is provided by the opposite use of the voice call in an acoustic form, and a user input unit 100 which receives an image and speech generated by a user of the imaging apparatus 10.

In the exemplary embodiment to be described hereinafter, for the convenience of the description, the output by a broadcasting signal, is referred to as an acoustic, and the output being exchanged between a user and an opposite user is referred to as a speech, as this output primarily includes the voice of a human being. However, the acoustic may also include the voice of a human being, and the speech may also include noise other than the voice of a human being, particularly, the sound from a TV or the echo of the speech of an opposite user that is being output through the acoustic output unit 282.

In addition, a remote, controller 20 which is configured to control the operation of the digital TV from a distance may be further included, and the remote controller 20, other than the control with respect to the output of a broadcasting program, is capable of performing the control with respect to a video call.

At the display 281, a total of three types of images may be simultaneously displayed. Thus, the display 281 includes a broadcasting domain 'I' within which an image extracted from a broadcasting signal is being displayed, a user domain 'II' within which an image of a user is being displayed, and an opposite user domain 'III' within which an image of the opposite user is being displayed, and since the three domains are simultaneously displayed at the display 281, a user may be able to conduct a video call while watching a broadcasting program.

The acoustic output unit 282 may be implemented in the form, of a speaker, and may be able to simultaneously output the acoustic signal, which is included in the broadcasting program signal, and the speech signal which is generated by an opposite user of a video call. The imaging apparatus 10 of the exemplary embodiment is provided with the acoustic output unit 282 at a rear surface thereof, and thus the acoustic output unit 282 is not illustrated in FIG. 1. However, the present disclosure is not limited hereto, and the position of the acoustic output, unit 282 is not limited, provided that the position is capable of outputting the acoustic to a user.

Figure 2:
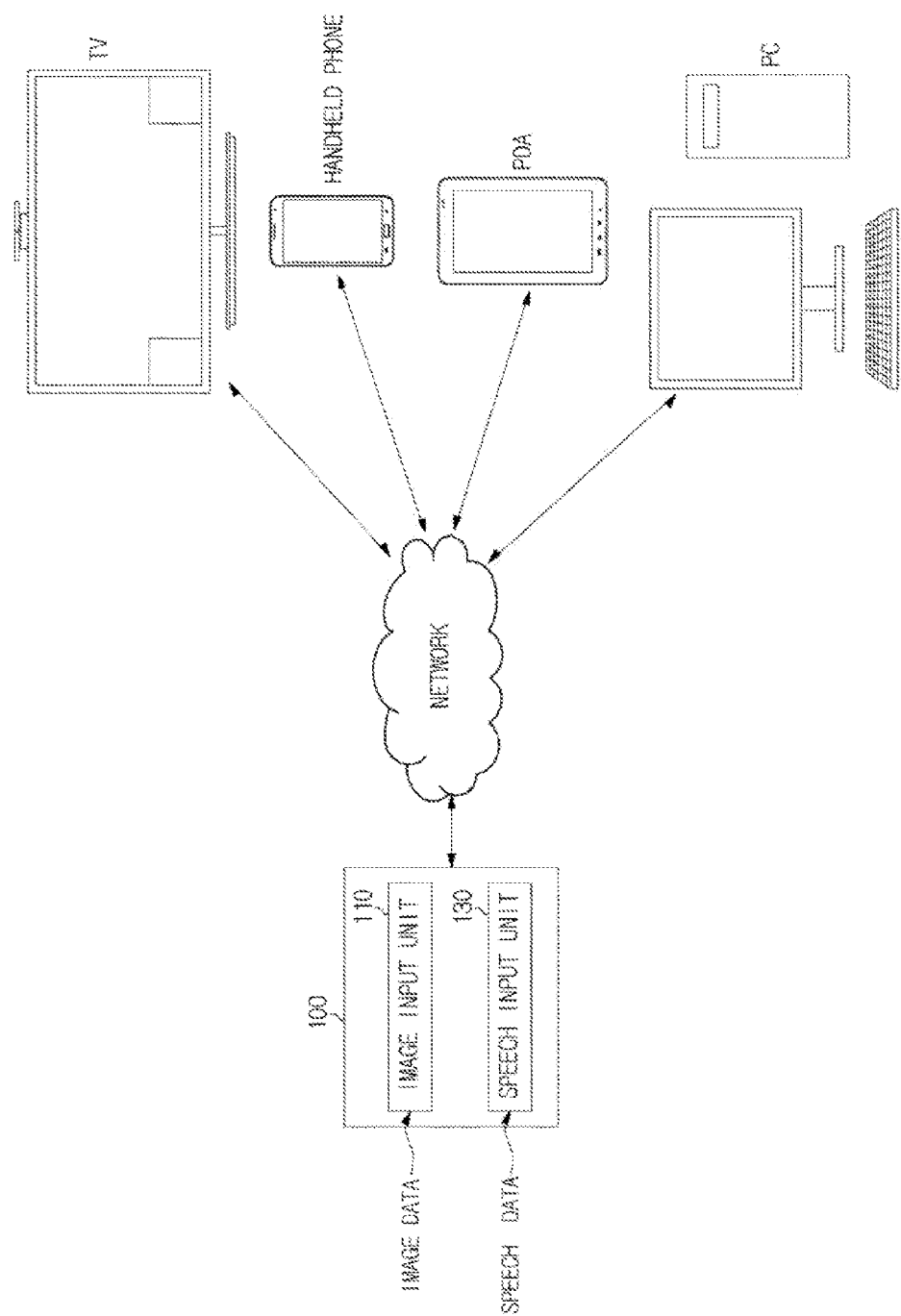
FIG. 2 is a block diagram which illustrates a structure of a video call system, according to an exemplary embodiment.

Referring also to FIG. 2, the user input unit 100 includes a speech input unit 130 which receives the speech of a user, and an image input unit 110 which captures the image of a user. The speech input unit 130 may be implemented in the form of a microphone, and although the purpose of the speech input unit 130 is to collect the speech of a user, but in addition to the speech of the user, a background sound, particularly, the acoustic sound of the broadcasting program being output from the acoustic output unit 282 of a digital TV or the speech of an opposite user, may also be collected by the speech input unit 130.

The user input unit 100, as illustrated in FIG. 1, may be implemented as a Multimedia over IP (MoIF) device separately from a body 200 of the imaging apparatus 10. Alternatively, the user input unit 100 may be integrally formed with the body 200.

The image input unit 110 includes a lens which is configured to receive the image of a user, a CCD sensor which is configured to photograph the image of a user that is received through the lens, i.e., an image photographing device, such as, for example, a CMOS sensor, and an Image Signal Processor (ISP) which is configured to process the image that is photographed by the image photographing device.

FIG. 2 is a block diagram which illustrates a structure of a video call system, according to an exemplary embodiment.

The video call system is referred to as a system, by using a plurality of apparatuses which are capable of processing and transmitting/receiving image data and speech data, and which are capable of facilitating conduct of a conversation between a calling party and a called party while enabling one party to watch the image that is transmitted from the opposite party and to listen to the speech that is transmitted from the opposite party.

Referring to FIG. 2, the digital TV, by obtaining image data corresponding to the image of a user from the image input unit 110, and by obtaining speech data corresponding to the speech of a user from the speech input unit 130 that is implemented by a microphone, may be able to transmit the image data and the speech data to outside apparatuses of the opposite user side that are connected via a wireless/cable network.

The outside apparatuses of the opposite user side may include one or more of a digital TV, a mobile terminal such as a mobile phone, a personal digital assistant (PDA), a notebook computer, and a personal computer (PC).

The network, which is configured to connect the digital TV of a user to the outside apparatuses of an opposite user, enables the transmitting/receiving of the image data and the speech data in compliance with the communication standards provided for a video call. For example, the digital TV of a user and the outside apparatuses of an opposite user, by using the network in accordance with the Ethernet or the IEEE 802.3, may be able to transmit/receive the image data and the speech data, or by using the network in accordance with the IEEE 802.11, may be able to transmit/receive the image data and the speech data.

Further, the network, by using the Voice over Broadband (VOBB) service or a legacy service, is capable of performing the transmitting/receiving of the data between the digital TV of the user and the outside apparatuses of the opposite user.

In particular, the VOBB may include a service such as, for example, at least one of the Voice over Cable Modem (VoCM), the Voice over Digital Subscriber Line (VoDSL), the Voice over Internet Protocol (VoIP), the Fixed Wireless Access (FWA), the Fiber To The Home (FTTH), and the Voice over Asynchronous Transfer Mode (VoATM), and the legacy service may include a service such as, for example, at least one of the Integrated Service Digital Network (ISDN), the Plain Old Telephone Service (POTS), a cellular service, and a 3G service.

According to such, the digital TV and the outside apparatuses, by transmitting/receiving the image data and the speech data by using a wireless network, a telephone network, a data network such as Internet, a cable modem system or a cellular network, enables a video call.

Further, the digital TV and the outside apparatuses are capable of transmitting/receiving the image data and the speech data in accordance with the standards that are set between the digital TV and the outside apparatuses, and for example, at least one of several protocols, such as the H.261 standard for the coding of the image data, the H.221 standard for the communication of the image data and the speech data, and the H.242 standard for setting and canceling a call, may be used.

For example, in the case of the video call system using Internet, protocols implemented on the video telephony standards such as H.323, H.263 and H.264 standards for the coding of the image and G.711 and G.729 for the coding of the speech may be employed.

However, the data transmitting/receiving method being used for an imaging apparatus to conduct a video call in accordance with exemplary embodiments is not limited to the exemplary embodiments that are described above, and the method is not limited provided that the method is consistent with an imaging apparatus conducting a video call.

Figure 3:
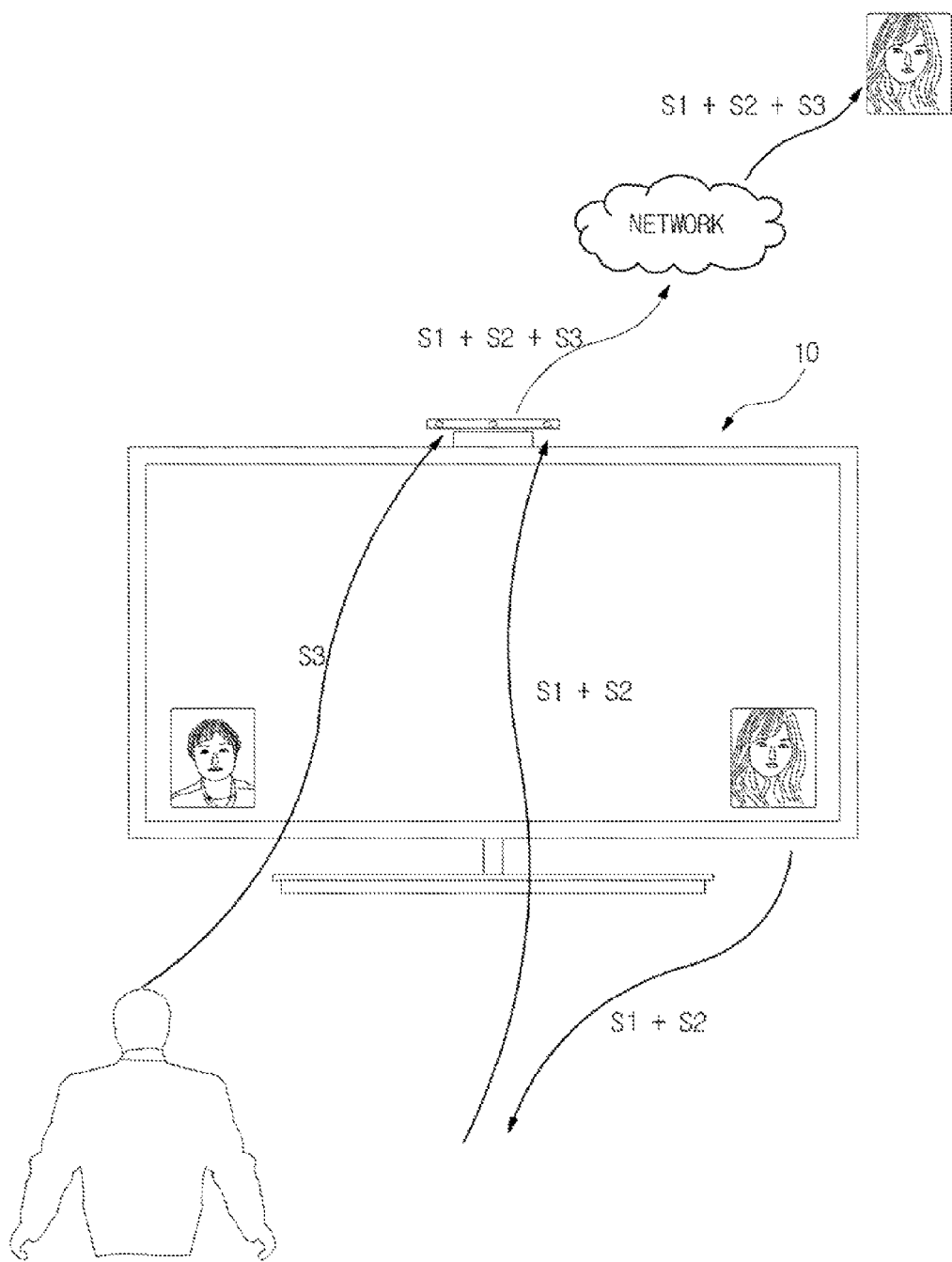
FIG. 3 is a drawing which illustrates a delivery of a speech signal with respect to a conventional imaging apparatus during a video call.

FIG. 3 is a drawing which illustrates a delivery of a speech signal with respect to a conventional imaging apparatus during a video call.

Referring to FIG. 3, in a case when a video call is being conducted while a user is watching a broadcasting program through the imaging apparatus, an acoustic sound of the broadcasting program 'S1' and a speech of an opposite user 'S2' are being output. When a user inputs a speech of the user 'S3' via the speech input unit 130 in order to speak with the opposite user, the background sound of the surroundings is also input, together with the speech of the user 'S3'. In particular, acoustic sound that is being output through the acoustic output unit may also be input in conjunction with the background sound of the surroundings, and in this case, the acoustic sound includes the acoustic sound of the broadcasting program 'S1' and the speech of the opposite user 'S2'.

Thus, the opposite user is provided with the speech of the user, as well as the speech of the opposite user and the acoustic sound of the broadcasting program from the user side. Conventionally, in order to prevent such, a video call is conducted in the state of having the acoustic sound of the broadcasting program reduced or muted.

Figure 4:
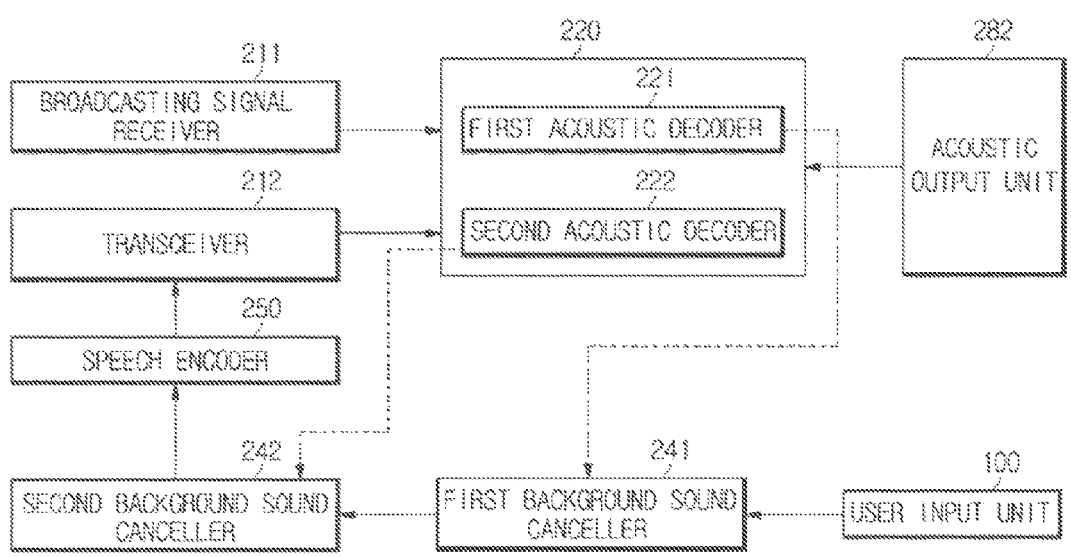
FIG. 4 is a controlled block diagram which schematically illustrates an imaging apparatus, in accordance with an exemplary embodiment.

FIG. 4 is a block diagram which schematically illustrates an imaging apparatus, in accordance with an exemplary embodiment.

Referring to FIG. 4, an imaging apparatus in accordance with an exemplary embodiment includes a broadcasting signal receiver 211, which is configured to receive a broadcasting signal; a transceiver 212, which is configured to transceive a speech signal to and from an opposite user; an acoustic processor 220 which is configured to decode the acoustic signal and/or the speech signal received from at least one of the broadcasting signal receiver 211 and the transceiver 212; the acoustic output unit 282, which is configured to output the acoustic signal that is decoded by the acoustic processor 220; the user input unit 100, which receives the speech of a user; a first background sound canceller 241, which is configured to generate a first output signal by cancelling the acoustic signal which is included in the broadcasting signal from the signal that is output from the user input unit 100; a second background sound canceller 242, which is configured to generate a second output signal by cancelling the speech signal which is received from an opposite user from the first output signal; and a speech encoder 250, which is configured to encode the second output signal that is output from the second background sound canceller 242.

The broadcasting signal receiver 211 is configured to receive a broadcasting signal which includes a first image signal and a first acoustic signal, and which is composed of an antenna and a tuner. The first image signal is output in the form of an image via the display 281, and the first acoustic signal is output in the form of the acoustic sound via the acoustic output unit 282.

The transceiver 212, via a predetermined communication path, receives a second image signal and a first speech signal from the opposite user of a video call, and transmits a third image signal which is generated by the user and a second speech signal which is generated by the user to the opposite user of the video call. The predetermined communication path that is being used by the transceiver 212 may utilize a communication network which includes at least one of the Internet, an Ethernet host, and a public switched telephone network, or may utilize a one-to-one communication network. In addition, wireless/cable communication networks may all be included in the communication path.

The acoustic processor 220, by decoding the first acoustic signal which is received by the broadcasting signal receiver 211 and the first speech signal which is received by the transceiver 212, outputs the received first acoustic signal and the received first speech signal in the acoustic form via the acoustic output unit 282.

The user input unit 100 receives the third image signal and the second speech signal, which are input by the user. In particular, the user input unit 100 receives a second acoustic signal which includes the second speech signal which is generated by the user. The user input unit 100 converts data with respect to the third image signal and the second speech signal into corresponding electrical signals in order to output the data in the form of the image signal and the speech signal. In addition, the third image signal may be encoded by the user input unit 100.

In addition, because the user input unit 100 captures the background sound of the surroundings as well as the speech of the user, the acoustic sound of the broadcasting program and the speech of the opposite user that are output through the acoustic output unit 282 may be collected together by the user input unit 100. In the case as such, the second acoustic signal includes the second speech signal which is generated by the user, the first acoustic signal which is included within the broadcasting signal, and the first speech signal which is received from the opposite user.

The first background sound canceller 241, by cancelling the first acoustic signal, which is received by the broadcasting signal receiver 211, from the second acoustic signal that is captured by the user input unit 100, generates the first output signal.

In particular, when the second acoustic signal, which includes the second speech signal which is generated by the user, the first acoustic signal, and the first speech signal which is received from the opposite user, is transmitted to the first background sound canceller 241, the first background sound canceller 241 generates the first output signal by cancelling the first acoustic signal from the second acoustic signal. The signal being cancelled by the first background sound canceller 241 is not the same as the acoustic signal that is output via the acoustic output unit 282, that, is, the signal being cancelled by the first background sound canceller 241 is not the same as the acoustic signal that is mixed with the first acoustic signal and the first speech signal, but is instead the first acoustic signal itself, which is received by the broadcasting signal receiver 211. As a result, the second speech signal of the user and the first speech signal of the opposite user are included in the first output signal.

The second background sound canceller 242 receives the first output signal that is generated by the first background sound canceller 241, and generates the second output signal by cancelling the first speech signal of the opposite user from the first output signal. The signal that is being cancelled by the second background sound canceller 242 is not the same as the signal that is being output via the acoustic output unit 282, but instead is the first speech signal of the opposite user that is received via the transceiver 212. As such, only the second speech signal of the user remains in the second output signal.

The second output signal is encoded in a proper format by using a speech encoder 250, and is transmitted to the opposite user via the transceiver 212.

The first background sound canceller 241 and the second background sound canceller 242 may be implemented, for example, by using at least one Acoustic Echo Canceller (AEC), and the operation of the first background sound canceller 241 and the second background sound canceller 242 that is implemented by the at least one AEC will, be described in detail hereinafter.

In the exemplary embodiment described above, the first acoustic signal is cancelled by the first background sound canceller 241 and the first speech signal of the opposite user is cancelled by the second background sound canceller 242. However, the first speech signal of the opposite user may be cancelled by the first background sound canceller 241, and the first acoustic signal may cancelled by the second background sound canceller 242. That is, the order of cancelling the speech signal is not limited hereto.

Figure 5:
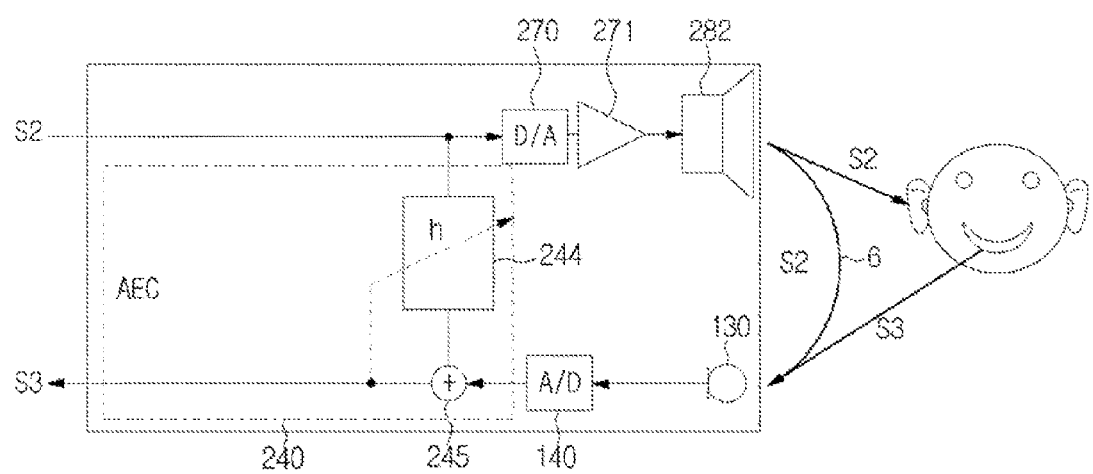
FIG. 5 is a structural view which schematically illustrates a structure of an AEC in conjunction with an imaging apparatus, in accordance with an exemplary embodiment.

FIG. 5 is a structural, view which schematically illustrates a structure of an AEC in conjunction with an imaging apparatus, in accordance with an exemplary embodiment. In FIG. 5, for the convenience of the description, the broadcasting signal will not be considered.

Referring to FIG. 5, the first speech signal, which is received via the transceiver 212, is converted into an analog signal from a digital signal by using a DA converter 270, and is amplified by an amplifier 271 in order to be emitted in the form of a sound pressure wave via the acoustic output unit 282, and in this illustration, the speech of an opposite user 'S2' is included in the sound pressure wave.

The emitted sound follows a sound path 6 that may include sound which propagates via multiple channels. Thus, echoes of the sound pressure wave are received by the speech input unit 130 of the user input unit 100, and as a result of the echo, the speech of the opposite user 'S2' is included.

Accordingly, the speech of the user 'S3' and the echo of the speech of the opposite user 'S2' are received by the speech input unit 130, and the AEC which resides within the imaging apparatus cancels the echo.

The signals that are received by the speech input unit 130 are all in the form of respective analog signals, and thus the signals are converted into digital signals by using an A/D converter 140, and are then transmitted to an AEC 240. In an exemplary embodiment, the AEC may include an adaptive filtering canceller, and as illustrated in FIG. 5, AEC 240 includes an adaptive filter 244 which is configured to filter a reference signal.

A filtering coefficient is an adaptive coefficient, and the adaptive filter is configured for an echo signal, while the coefficients of the adaptive filter may relate to the estimated values of the acoustic impulse response. The adaptive filter may be implemented by various algorithms, and in an exemplary embodiment, the adaptive filter may be implemented by one or more of the normalized Least Mean Squares (NLMS) and the Frequency Domain Adaptive Filter (FDAF).

The signal which is processed by the A/D converter 140, from which the echo of the speech of the opposite user 'S2' has been cancelled, is transmitted to the opposite user via the transceiver unit 212. Thus, in the speech signal being transmitted to the opposite user, the speech signal that is transmitted to the user from the opposite user is excluded.

By using two separate units of the AEC, only the speech signal of the user may be transmitted to the opposite user after cancelling the broadcasting acoustic echo and the echo of the speech of the opposite user.

Figure 6:
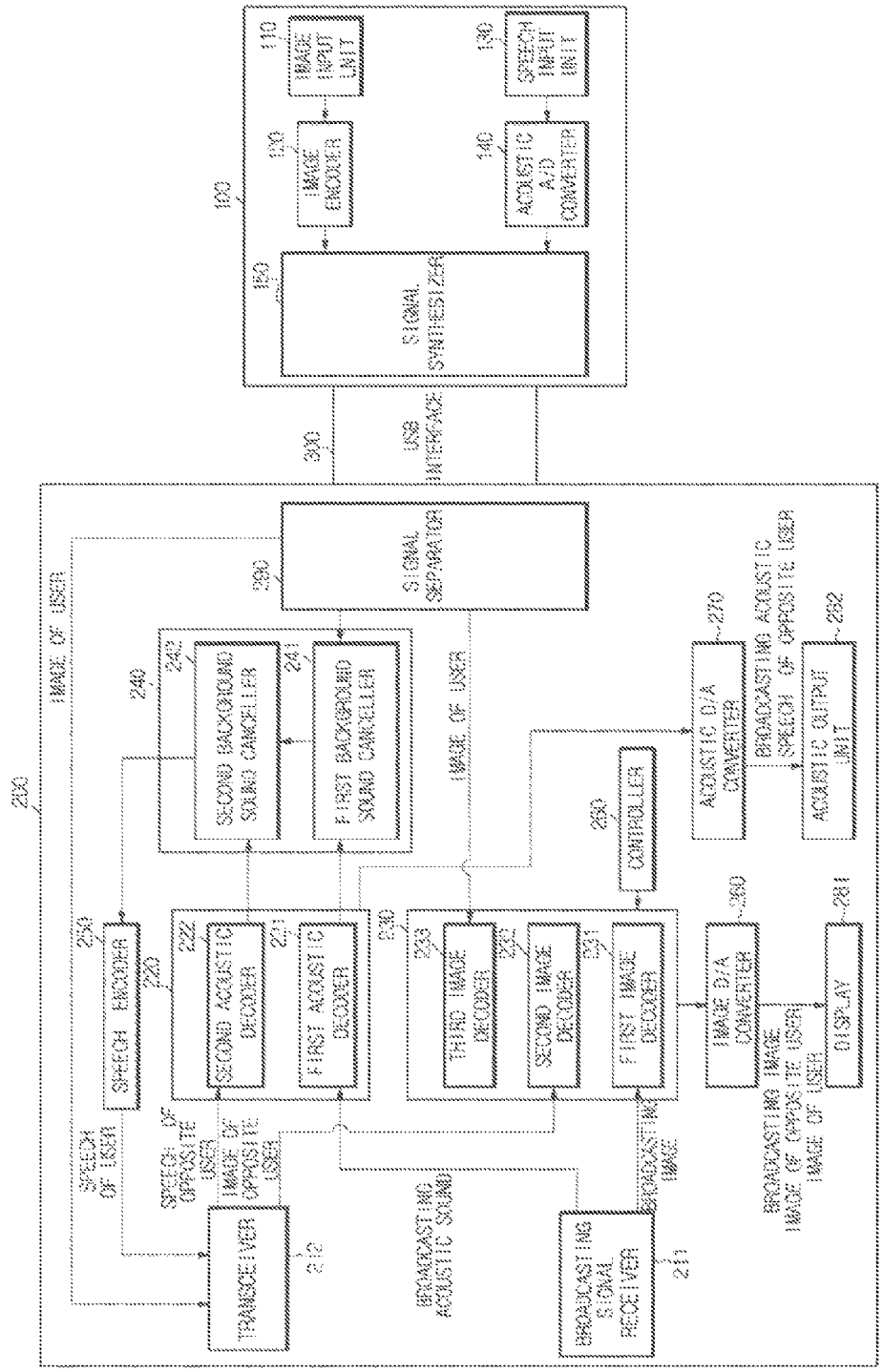
FIG. 6 is a block diagram which illustrates a detailed structure of an imaging apparatus, in accordance with an exemplary embodiment.

FIG. 6 is a block diagram which illustrates a detailed structure of the imaging apparatus, in accordance with an exemplary embodiment.

Referring to FIG. 6, the user input unit 100 includes the image input unit 110, an image encoder 120, the speech input unit 130, the speech A/D converter 140, and a signal synthesizer 150. The description with reference to the structure described on FIG. 4 will be omitted.

The speech A/D converter 140 performs a sampling that converts the second speech signal, which is received via the speech input unit 130, into a digital signal, and the converted speech signal, after the echo cancelling task is completed at the body 200, is compressed, and then is transmitted to the opposite user.

The image input unit 110 includes a lens which is configured to receive the image of the user in the form of a light signal, and an image photographing device which is configured to output the light signal after converting the light signal, which is received from the lens, into an electrical image signal, and the image photographing device is provided with an image A/D converter which converts the electrical signal into a digital signal that, is suitable for data processing.

The resulting image signal that is output by the image input unit 110 is delivered to the image encoder 120, and the image encoder 120 compresses, that is, encodes, the image signal by using a video compressing algorithm. The compressed image signal is then transmitted to the opposite user via the transceiver 212, and at the same time, is output via the display 281 within the imaging apparatus 10.

In particular, the image encoder 120 may compress the image signal which is to be transmitted to the opposite user via the transceiver 212, and the image signal which is to be output via the display 281 in the same format, or in different formats. For example, the image signal to be transmitted to the opposite user may be compressed by using the B.264 format, while the image signal, to be output via the display 281 may be compressed by using the MJPEG format, or may be transmitted to the body 200 in the form of raw data without being compressed.

In a case when the image encoder 120 compresses the image signal that is to be output via the display unit 281, the image signal is output via the display 281 after being subjected to an additional decoding process from within the body 200.

The signal synthesizer 150 outputs the image signal which includes an image of the user, which is compressed by the image encoder 120, and the speech signal which is received from the speech A/D converter 140 to the body 200 after merging the image signal and the speech signal. In particular, the body 200 is referred to as a structure of the imaging apparatus except for the user input unit 100, and the user input unit 100 and the remaining components, regardless of whether the user input unit 100 and the remaining structure are physically separated, are functionally separated.

As in the exemplary embodiment described above, by including the image encoder 120 which is configured to compress the image signal received by the user input unit 100 without including the image encoder 120 in the body 200, the workloads of the body 200, which performs many operations and tasks, may be reduced.

The signal synthesizer 150 may be implemented, for example, by a stream container. In the process of synthesizing signals, the image signal of the user and the speech signal of the user are synchronized. The amount of time consumed in having the image signal of the user compressed is different from the amount of time consumed in having the speech signal of the user sampled. Thus, the signal synthesizer 150, in order to ensure that the image of the user and the speech of the user correspond to each other, synchronizes both signals together.

The user input unit 100 may be connected to the body 200 via an USB interface 300, and in this case, the image signal of the user and the speech signal that are being output via the signal synthesizer 150 are provided with an USB format. Alternatively, the user input unit 100 and the body 200 may be connected to each other via a different interface, and in that case, the image signal and the speech signal that are being output via the signal synthesizer 150 are provided with a different format thereof, so that the image signal and the speech signal may be suitable for the corresponding interface. In a case when the interface 300 of the user input unit 100 and the body 200 is provided in the form of a wireless interface, in order to facilitate wireless communication between the user input unit 100 and the body 200, a structure which modulates and demodulates signals is further included.

A signal separator 290 of the body 200 may be implemented, for example, in the form of a stream container, similarly as in the signal synthesizer 150, and is configured to separate the signal stream, which is received via the USB interface 300, into the component image signal and the component speech signal. After separation, the component image signal is transmitted to the transceiver 212 and to the image processor 230, and the component speech signal is transmitted to the first background canceller 241.

The transceiver 212, via a predetermined communication path, receives the encoded image signal and the speech signal from the opposite user, and the received image signal is transmitted to the image processor 230, and the received speech signal is transmitted to the acoustic processor 220. In addition, the speech signal of the opposite user which is processed by the acoustic processor 220 may be provided as a reference signal to the second background sound canceller 242.

The broadcasting image signal and the broadcasting acoustic signal, which are received by the broadcasting signal receiver 211, are also transmitted to the image processor 230 and to the acoustic processor 220, respectively, and the broadcasting acoustic signal which is processed by the acoustic processor 220 may be provided as a reference signal to the first background sound canceller 241.

The acoustic processor 220 includes a decoder which is configured to decode the compressed acoustic signal, and also includes a first acoustic decoder 221 which is configured to decode the broadcasting acoustic signal that is received via the broadcasting signal receiver 211, and a second acoustic decoder 222 which is configured to decode the speech signal of the opposite user that is received via the transceiver 212.

The first background sound canceller 241 may be implemented in the form of an AEC, and uses the broadcasting acoustic signal that is received by the broadcasting signal receiver 211 as a reference signal. In particular, the reference signal is brought from the broadcasting signal receiver 211 via the first acoustic decoder 221. The user side acoustic signal, which is received by the first background sound canceller 241 via the user input unit 100 and the signal separator 290, becomes the first output signal, as the broadcasting acoustic signal, that is, the reference signal, is cancelled from the user side acoustic signal by using a subtractor. As a result, the first output signal includes the speech signal of the opposite user and the speech signal of the user.

The first output signal is transmitted to the second background sound canceller 242, and the second background sound canceller 242 may be implemented in the form of an AEC. The second background sound canceller 242 may use the speech signal of the opposite user, which is received by the transceiver 212, as a reference signal. In particular, the second background sound canceller 242 brings the reference signal from the transceiver 212 via the second acoustic decoder 222. When the first output signal is input into the second background sound canceller 242, a subtractor which is included within the second background sound canceller 242 cancels the speech signal of the opposite user, that is, the reference signal, from the first output signal, in order to generate the second output signal. As a result, the second output signal includes only the speech signal of the user.

In the exemplary embodiment illustrated in FIG. 6, the first background sound canceller 241 and the second background sound canceller 242 are both included in the body 200. However, the first background sound canceller 241 may be included in the user input unit 100, while the second background sound canceller 242 may be included in the body 200.

The second output signal is transmitted to the speech encoder 250, and the speech encoder 250 compresses the second output signal, that is, the speech signal of the user, in order to be suitable, for a transmission format, and transmits the compressed output signal to the opposite user via the transceiver 212.

The image processor 230 processes the image signal received by the broadcasting signal receiver 211, the image signal separated by the signal separator 290, and the image signal of the opposite user received by the transceiver 212, and outputs the processed image signals via the display 281.

The image processor 230 may include a first image decoder 231 which is configured to decode the broadcasting image signal, a second image decoder 232 which is configured to decode the image signal of the opposite user, and a third image decoder 233 which is configured to decode the image signal of the user. The image processor 230 decodes the image signals being input, and outputs the processed image signals.

The first image decoder 231 and the second image decoder 232 may include hardware decoders that are physically independent, and the third image decoder 233 may include a software decoder. In particular, a method for decoding an image signal includes a method for using an independent hardware decoder and a method for using a software decoder that operates in accordance with control which is executed by a controller 260.

In the exemplary embodiment described above, the image signal of the opposite user and the broadcasting image signal are processed by using the independent hardware decoder, while the image signal of the user may be decoded by using the software decoder. In addition, in a case in which the image signal of the user which is to be output via the display 281 is not compressed, the third image decoder 233 may not be provided.

The controller 260 may be implemented, for example, by using a Central Processing Unit (CPU) that performs an overall control of the apparatus 10 at the body 200, and the software decoder includes a JPEG decoder. In particular, the image signal of the user is decoded by using the JPEG decoder that is capable of performing a decoding under the control of the CPU. Without using the JPEG decoder, the controller 260 may directly decode the image of the user, or depending on the processing speed and the processing ability of the controller 260, a decoding of the image of the user may be performed by using a different component.

In the exemplary embodiment described above, while the two hardware decoders and the one software decoder are being used, because the three types of images may all be displayed on the display 281, the manufacturing cost of the imaging apparatus may be reduced, and a user may be able to simultaneously watch the broadcasting image and the image of the opposite user.

The image processor 230, by synchronizing the three different types of the image signals that are received via different routes, outputs the image signals via the display 281. For example, the broadcasting image signal and the image signal of the opposite user may be processed as a first layer, while the image signal of the user may be processed as a second layer that overlaps with the first layer. The image processor 230, by synthesizing the image signals into a layer structure having different layers with respect to each other based on the control of the controller 260, may be able to output the image signals via the display 281.

In particular, the controller 260, by considering the communication status of the transceiver 212 or the processing capacity of the image processor 230, may adjust the image compression rate or the resolution of the image encoder 120. Accordingly, the control signal which is configured for the adjustment is output to the user input unit 100 via the USB interface 300, and the image encoder 120 of the user input unit 100 may directly receive the control signal from the controller 260, or may indirectly receive the control signal from a second controller that is additionally provided at the user input unit 100.

In addition, the image signal which is output by the image processor 230 is converted into an analog signal by using the image DA converter, and then is displayed on the display 281.

The display 281 displays the three types of the images that are received from the image processor 230. The display 281 may be implemented, for example, in the form of at least one of a liquid crystal display (LCD) panel, an organic light-emitting diode (OLED) panel, a LED panel, or a plasma display panel (PDF).

The acoustic DA converter converts the speech signal of the opposite user and the broadcasting acoustic signal, which are output by the acoustic processor 220, into analog signals, and the acoustic output unit 282, by outputting the converted signals, may enable a user to listen to both of the speech of the opposite user and the acoustic sound of the broadcasting program.

In the exemplary embodiment described above, two AECs are provided such that the two AECs cancel the speech signal of the opposite user and the broadcasting acoustic signal by using the speech signal of the opposite user and the broadcasting acoustic signal as respective reference signals. However, in another exemplary embodiment to be described hereinafter, by using a single AEC which is provided with a plurality of channels, both of the speech signal of the opposite user and the broadcasting acoustic signal may be cancelled by using the single AEC.

Figure 7:
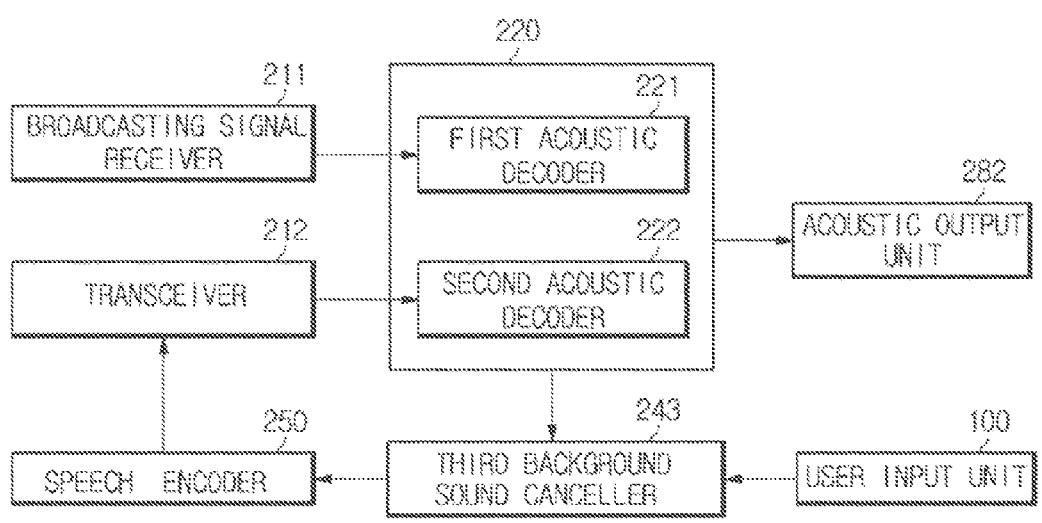
FIG. 7 is a block, diagram which illustrates an imaging apparatus, in accordance with an exemplary embodiment.

FIG. 7 illustrates a block diagram of an imaging apparatus in accordance with an exemplary embodiment.

Referring to FIG. 7, an imaging apparatus in accordance with an exemplary embodiment includes a broadcasting signal receiver 211 which is configured to receive a broadcasting signal which includes a first image signal and a first acoustic signal; a transceiver 212 which is configured to receive a second image signal and a first speech signal from an opposite user, and to transmit a third image signal and a second speech signal which are generated by a user; a first speech decoder which is configured to decode the first acoustic signal that is received by the broadcasting signal receiver 211, a speech processor which includes a second speech decoder which is configured to decode the first speech signal of the opposite user that is received by the transceiver 212; an acoustic output unit 282 which is configured to output the decoded speech signal; a user input unit 100 that captures the third image signal and the second speech signal which are generated by the user; a third background sound canceller 243 which is configured to cancel the background sound from a second acoustic signal that is output by the user input unit 100, and a speech encoder 250 which is configured to compress a third output signal that is output by the third background sound canceller 243. The components of the structure that are provided with the same names and functionalities will be provided with the same reference numerals as in the exemplary embodiments which are described above.

The third background sound canceller 243 may be implemented, for example, by using an AEC, similarly as described above with respect, to each of the first background sound canceller 241 and the second background sound canceller 242. However, by contest with the first background sound canceller 241 and the second background sound canceller 242, each of which uses a single reference signal which corresponds to a single channel, the third background sound canceller 243 uses a plurality of channels, and thus, the third background sound canceller 243 may be provided with at least two reference signals.

Thus, the first acoustic signal and the first speech signal of the opposite user, which are received via the broadcasting signal receiver 211 and the transceiver 212, respectively, and are decoded by using a decoder, may be used as reference signals, and when the second acoustic signal, which includes the second speech signal which is generated by the user, the first speech signal of the opposite user, and an echo of the first acoustic signal, is received into the AEC, by cancelling the first acoustic signal and the first speech signal by using a subtractor provided at the AEC, a third output signal which includes only the second speech signal of the user may be generated.

In particular, the signal that is used as the reference signal of the third background sound canceller 243 is not the acoustic signal that is output via the acoustic output unit 282, but instead includes both of the first acoustic signal that is received by the broadcasting signal receiver 211 and the first speech signal of the opposite user that is received by the transceiver 212. More particularly, the third background sound canceller 243 extracts the reference signals from the signals respectively received by the broadcasting signal receiver 211 and the transceiver 212 and respectively provided via the first acoustic decoder 221 and the second acoustic decoder 222.

The third output signal that is generated by the third background sound canceller 243 is encoded at the speech encoder 250, and is transmitted to the opposite user via the transceiver 212.

Figure 8:
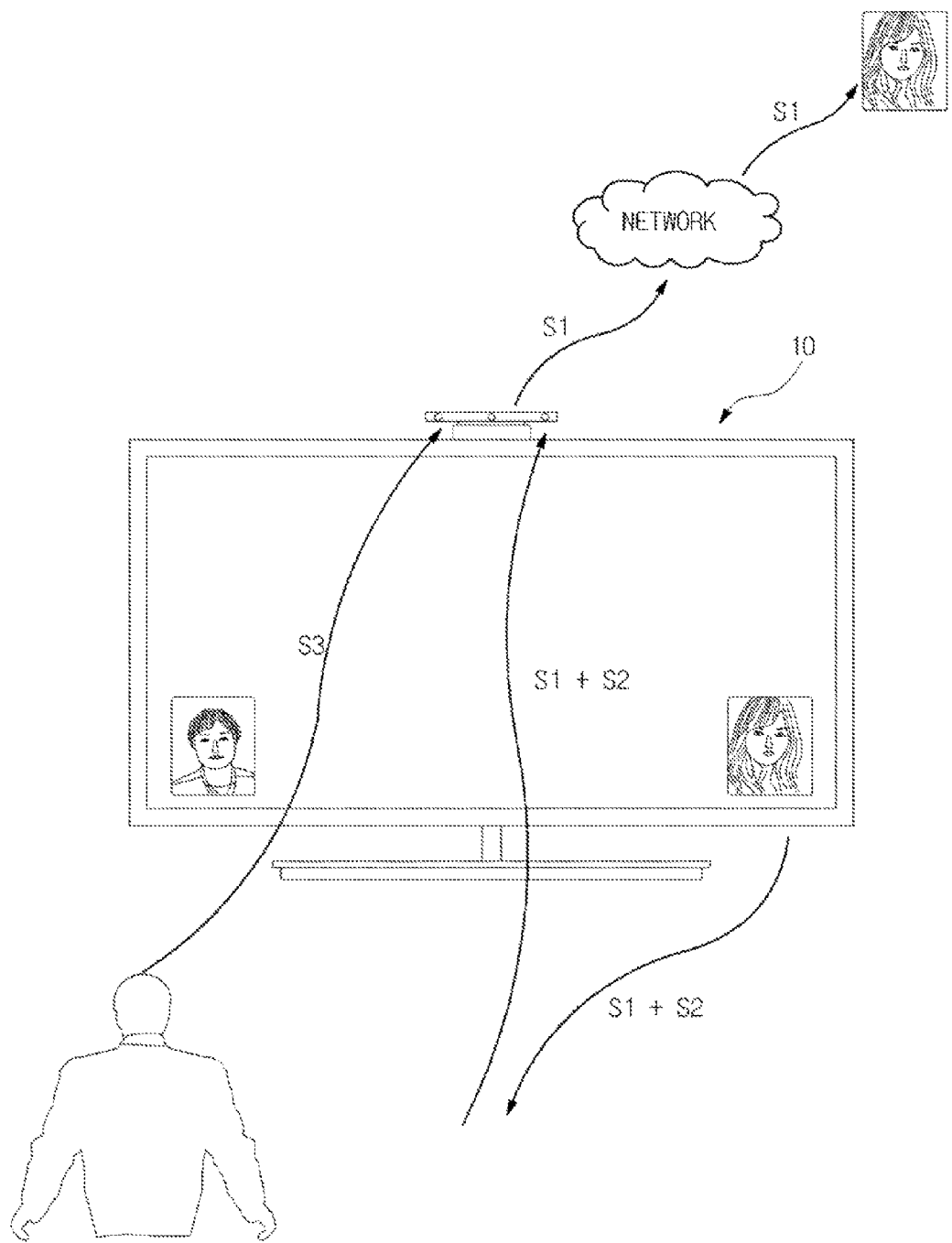
FIG. 8 is a drawing which illustrates a delivery of a speech signal with respect to an imaging apparatus, in accordance with an exemplary embodiment.

FIG. 8 is a drawing which illustrates a delivery of a speech signal with respect to a video call being implemented by an imaging apparatus, in accordance with an exemplary embodiment.

Referring to FIG. 8, in a case when the acoustic sound of the broadcasting program 'S1' and the speech of the opposite user 'S2' are being output via the acoustic output unit 282 of the imaging apparatus, the acoustic sound of the broadcasting program 'S1' and the speech of the opposite user 'S2' via the user input unit 100, are being input into the imaging apparatus again in conjunction with the speech of the user 'S3'. However, the imaging apparatus, in accordance with an exemplary embodiment, cancels the speech of the opposite user 'S2' and the acoustic sound of the broadcasting program 'S1' by using the background sound canceller, and thus only the speech of the user 'S3' is included in the speech signal that is being transmitted to the opposite user via a network. Thus, the opposite user may be able to conduct a video call without having to listen to an echo of his own speech and without having to listen to the sound of the broadcasting program that is considered to be a noise with respect to the speech of the user.

Hereinafter, a method for controlling an imaging apparatus in accordance with an exemplary embodiment will be described.

Figure 9:
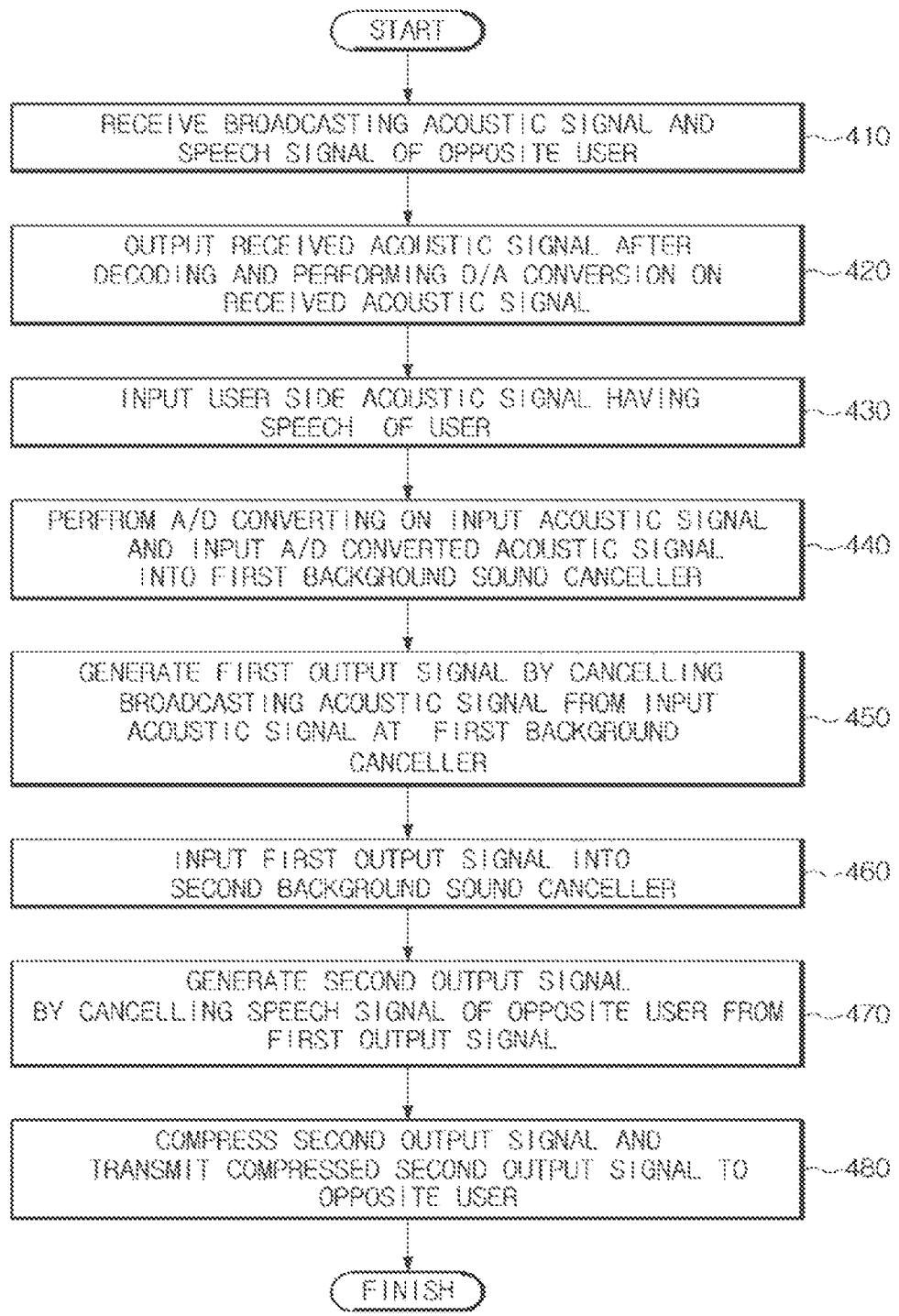
FIG. 9 is a flow chart which illustrates a control method which is executable by using an imaging apparatus, in accordance with an exemplary embodiment.

FIG. 9 illustrates a flow chart with respect to a control method which is executable by using an imaging apparatus in accordance with an exemplary embodiment, FIG. 9 illustrates operations which relate only to the transmitting/ receiving and the outputting of a speech signal.

Referring to FIG. 9, first, in operation 410, die broadcasting acoustic signal and the speech signal of the opposite user are respectively received by the broadcasting signal receiver 211 and by the transceiver 212. Then, by using a decoder, the received broadcasting acoustic signal and the received speech signal of the opposite user are decoded. In operation 420, the decoded broadcasting acoustic signal and the decoded speech signal of the opposite user are converted into analog signals by using the acoustic DA converter, and are output in acoustic form via the acoustic output unit 282.

In operation 430, while watching a broadcasting program via the imaging apparatus, a user who conducts a video call inputs a user side acoustic signal via the user input unit 100. In the user side acoustic signal that, is input via the user input unit 100, the broadcasting acoustic sound and the speech of the opposite user, both of which are output via the acoustic output unit 282, may be included in conjunction with the speech of the user.

In operation 440, die user side acoustic signal that is received via die user input unit 100 is converted into a digital signal by using the acoustic DA converter 140, and the converted digital signal is then input into the first background sound canceller 241. In operation 450, the first background sound canceller 241, by cancelling the broadcasting acoustic signal from the user side acoustic signal, generates a first output signal. The first background sound canceller 241 may be implemented, for example in the form of an AEC, and the AEC, by using the broadcasting acoustic signal received by the broadcasting signal receiver 211 as a reference signal, cancels the broadcasting acoustic signal when the user side acoustic signal, which is input into the AEC, is processed by the subtractor.

In operation 460, the first output signal is input into the second background sound canceller 242, and the second background sound canceller 242, by cancelling the speech signal of the opposite user from the first output signal, generates a second output signal. The second background sound canceller 242 may also be implemented in the form of an AEC, and in operation 470, the AEC, by using the speech signal of the opposite user which is received by the transceiver 212 as a reference signal, cancels the speech signal of the opposite user when the first output signal is processed by the subtractor which is provided within the AEC. As a result, in the second output signal, only the speech of the user is included.

In operation 480, the second output signal is compressed by the speech encoder 250, and then transmitted, via the transceiver 212 to the user.

In an exemplary embodiment, the broadcasting speech signal is first cancelled, and then the speech signal of the opposite user is cancelled. Alternatively, the speech signal of the opposite user may be cancelled first, and then the broadcasting speech signal may be cancelled.

Figure 10:
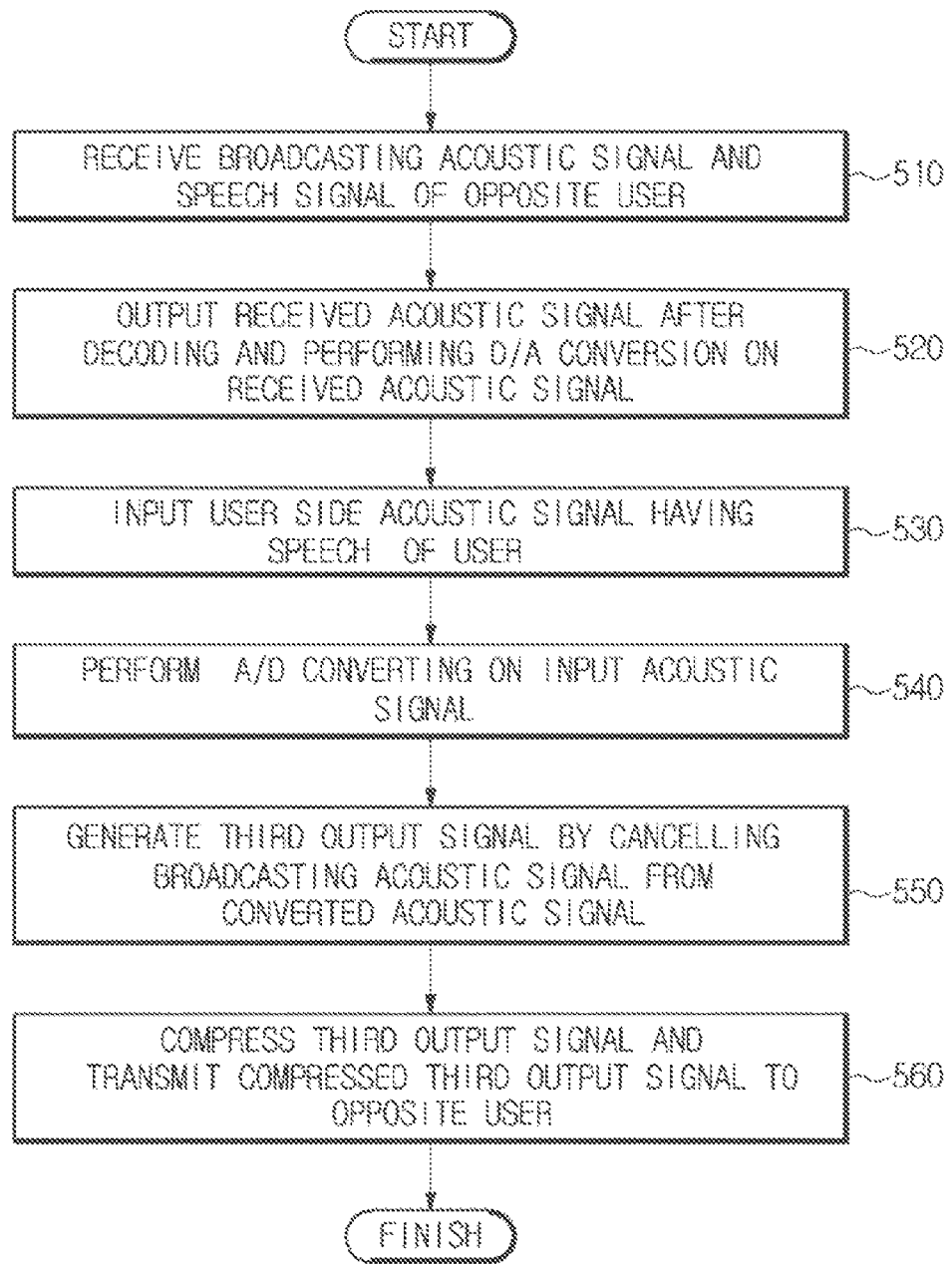
FIG. 10 is a flow chart which illustrates a control method which is executable by using an imaging apparatus, in accordance with an exemplary embodiment.

FIG. 10 illustrates a flow chart with respect to a control method which is executable by using an imaging apparatus in accordance with an exemplary embodiment, FIG. 10 illustrates only operations which relate to the transmitting/ receiving and the outputting of a speech signal.

Referring to FIG. 10, the process in operation 510 of receiving and decoding the broadcasting speech signal and the speech signal of the opposite user, and the process in operation 520 of outputting the decoded broadcasting speech signal and the decoded speech signal of the opposite user via the acoustic output unit 282, are respectively similar to operation 410 and operation 420 as illustrated in FIG. 9, and thus the description of such will be omitted.

In operation 530, a user inputs a user side acoustic signal via the user input unit 100. In the user side acoustic signal, the speech of the opposite user and the broadcasting acoustic sound, both of which are output via the acoustic output unit 282, may be included in conjunction with the speech of the user.

In operation 540, the user side acoustic signal that is received by the user input unit 100 is converted into a digital signal by using the acoustic A/D converter 140, and the converted digital signal is then input into the third background sound canceller 243.

In operation 550, the third background sound canceller 243, by cancelling the broadcasting acoustic signal and the speech signal of the opposite user, both of which are included in the received signal, generates a third output signal. The third background sound canceller 243 may be implemented, for example, in the form of an AEC which includes a plurality of channels, and thus may be provided with at least two reference signals, i.e., one reference signal for each channel of the plurality of channels.

Thus, the third background sound canceller 243, which is implemented in the form of the AEC which includes a plurality of channels, by using the broadcasting acoustic signal, which is received by the broadcasting signal receiver 211, and by using the speech signal of the opposite user, which is received by the transceiver 212, as reference signals, cancels the broadcasting acoustic signal and the speech signal of the opposite user from the user side acoustic signal. As a result, in the third output signal, only the speech signal of the user is included.

The third output signal, which is output by the third background sound canceller 243, is sent to the speech encoder 250, in operation 560, the speech encoder 250 compresses the third output signal using a proper format, and then transmits the compressed third output signal to the transceiver 212, which then transmits the compressed third output signal to the opposite user via a network.

In accordance with the imaging apparatus and the control method thereof according to one or more exemplary embodiments, in a case when a user simultaneously watches a broadcasting program and conducts a video call by using the imaging apparatus, by transmitting the speech signal of the user to the opposite user after the broadcasting speech signal and the speech signal of the opposite user are all cancelled, the quality of the video call may be enhanced.

Although a few exemplary embodiments have been shown and described, it will be appreciated by those skilled in the art that changes may be made in these exemplary embodiments without departing from the principles and spirit of the present disclosure, the scope of which is defined in the claims and their equivalents.

What is claimed is:

1. An imaging apparatus for conducting a video call and providing broadcasting simultaneously, the imaging apparatus comprising:
    a broadcasting signal receiver which receives a broadcasting signal which includes a first image signal and a first acoustic signal;
    a transceiver which transceives a second image signal and a first speech signal via a network;
    an acoustic output unit which outputs the received first acoustic signal and the transceived first speech signal;
    a user input unit which receives a second acoustic signal which includes a second speech signal which is generated by a user; and a background sound canceller which comprises a first acoustic echo canceller and a second acoustic echo canceller, the first acoustic echo canceller being configured to generate a first output signal by cancelling the received first acoustic signal from the received second acoustic signal, and the second acoustic echo canceller being configured to generate a second output signal by cancelling the transceived first speech signal from the first output signal.

2. The imaging apparatus of claim 1, wherein:
the first acoustic echo canceller is further configured to use the first acoustic signal as a reference signal.

3. The imaging apparatus of claim 2, wherein:
the second acoustic echo canceller is further configured to use the first speech signal as a reference signal.

4. The imaging apparatus of claim 3, further comprising:
a first acoustic processor which decodes the received first acoustic signal,
wherein the first acoustic echo canceller uses the decoded first acoustic signal as a reference signal.

5. The imaging apparatus of claim 4, further comprising:
a second acoustic processor which decodes the transceived first speech signal,
wherein the second acoustic echo canceller uses the decoded first speech signal as a reference signal.

6. The imaging apparatus of claim 4, further comprising:
a speech encoder which encodes the second output signal.

7. An imaging apparatus for conducting a video call and providing broadcasting simultaneously, the image apparatus comprising:
a broadcasting signal receiver which receives a broadcasting signal which includes a first image signal and a first acoustic signal;
a transceiver which transceives a second image signal and a first speech signal via a network;
an acoustic output unit which outputs the received first acoustic signal and the transceived first speech signal in an acoustic form;
a user input unit which receives a second acoustic signal, which includes a second speech signal which is generated by a user, and an image signal relating to the user; and
a background sound canceller which comprises a multi-channel acoustic echo canceller which is configured to cancel, on a first channel, the received first acoustic signal, and to cancel, on a second channel, the transceived first speech signal from the received second acoustic signal.

8. The imaging apparatus of claim 7, wherein:
the multi-channel acoustic echo canceller is further configured to use at least two reference signals.

9. The imaging apparatus of claim 8, wherein:
the at least two reference signals used by the background sound canceller include the received first acoustic signal and the transceived first speech signal.

10. The imaging apparatus of claim 9, further comprising:
a first acoustic processor which decodes the received first acoustic signal and a second acoustic processor which decodes the transceived first speech signal,
wherein the background sound canceller uses the decoded first acoustic signal and the decoded first speech signal as reference signals.

11. A method for controlling an imaging apparatus which conducts a video call between a first user and a second user, and provides broadcasting simultaneously, the method comprising:
receiving a broadcasting signal which includes a first image signal and a first acoustic signal;
receiving a second image signal and a first speech signal from the second user;
outputting the received first acoustic signal and the received first speech signal;
receiving a second acoustic signal which includes speech generated by the first user;
using a first acoustic echo canceller to generate a first output signal by cancelling the received first acoustic signal from the received second acoustic signal; and
using a second acoustic echo canceller to generate a second output signal by cancelling the received first speech signal from the generated first output signal.

12. The method of claim 11, wherein:
the first acoustic echo canceller is configured to use the received first acoustic signal as a reference signal.

13. The method of claim 12, wherein:
the second acoustic echo canceller is configured to use the received first speech signal as a reference signal.

14. The method of claim 11, further comprising:
encoding the second output signal; and
transmitting the encoded second output signal to the second user via a network.

15. A method for controlling an imaging apparatus which conducts a video call between a first user and a second user, and provides broadcasting simultaneously, the method comprising:
receiving a broadcasting signal which includes a first image signal and a first acoustic signal via a broadcasting signal receiver;
receiving a second image signal and a first speech signal from the second user via a transceiver;
outputting the received first acoustic signal and the received first speech signal in an acoustic form via an acoustic sound output unit;
receiving a second acoustic signal which includes speech generated by the first user via a user input unit; and
using a multi-channel acoustic echo canceller to cancel on a first channel, the received first acoustic signal and to cancel, on a second channel, the received first speech signal from the received second acoustic signal.

16. The method of claim 15, wherein:
the multi-channel acoustic echo canceller is configured to use at least two reference signals.

17. The method of claim 16, wherein:
the at least two reference signals used by the multi-channel acoustic echo canceller comprise the received first acoustic signal and the received first speech signal.

* * * * *